United States Patent
Zimmer et al.

[11] Patent Number: 5,551,236
[45] Date of Patent: Sep. 3, 1996

[54] TURBOCHARGER CONTROL MANAGEMENT SYSTEM

[75] Inventors: Michael T. Zimmer, Brookfield; Richard J. Kakoczki, Waukesha; James A. Davis, Ripon; Jerrold A. Pratt, Eagle; Edward O. Reinbold, Waukesha, all of Wis.

[73] Assignee: Dresser Industries, Inc., Dallas, Tex.

[21] Appl. No.: 236,467

[22] Filed: May 2, 1994

[51] Int. Cl.⁶ .................................. F02B 33/44
[52] U.S. Cl. .............................. 60/605.1; 60/611
[58] Field of Search ................ 60/611, 606, 605.1

[56] References Cited

U.S. PATENT DOCUMENTS

| | | | |
|---|---|---|---|
| 4,378,677 | 4/1983 | Zumstein | 60/606 |
| 4,459,809 | 7/1984 | Tadokoro et al. | 60/611 |
| 4,490,622 | 12/1984 | Osborn | 60/605.1 |

FOREIGN PATENT DOCUMENTS

| | | | |
|---|---|---|---|
| 2647836 | 4/1978 | Germany | 60/611 |
| 0047439 | 2/1991 | Japan | 60/606 |

*Primary Examiner*—Charles Freay
*Attorney, Agent, or Firm*—Andrus, Sceales, Starke & Sawall

[57] ABSTRACT

An electronic turbocharger control system for an internal combustion engine is provided to control at least one turbocharger by controlling a bypass valve and a wastegate in response to the engine speed, engine load, ambient temperature, and the operating environment's barometric pressure wherein the turbocharger is controlled to operate within predetermined islands of efficiency on a pressure ratio versus mass airflow map thereby allowing the adaptation of one turbocharger assembly for various applications. The method and apparatus provides improved engine efficiency and increases low speed torque.

11 Claims, 6 Drawing Sheets

TURBOCHARGER CONTROL MANAGEMENT SYSTEM

BACKGROUND AND SUMMARY

The invention relates to a turbocharger control and management system for maximizing the efficiency of a turbocharger and an internal combustion engine.

A turbocharger includes a compressor and a turbine. The turbine drives the compressor with exhaust energy created by the internal combustion engine. The engine exhaust drives a turbine wheel in the turbine of the turbocharger and is discharged through an exhaust system. The turbine wheel drives a shaft connected to a compressor wheel in the compressor which pressurizes intake air, previously at atmospheric pressure, and forces it typically through an intercooler and over a throttle valve and into an engine intake manifold. Controlling the output of the turbocharger to obtain desired engine operation has been a long standing problem. Too much output can create erratic engine performance and permanently damage engine components. Too little output causes engine hesitation, loss of power, and inefficient operation. Additionally, changes in atmospheric pressure, ambient temperature and engine speed affect the overall efficiency of the turbocharger which directly affects the performance, power output, and fuel economy of the engine.

Prior to the present invention, some turbocharger systems used a bypass valve connected to the output of the compressor to relieve excessive pressure. Typically, the bypass valve of these prior art systems sensed the differential pressure between the compressor discharge and intake manifold, i.e. the pressure difference across the throttle valve, and opened the bypass valve to vent pressure at a given threshold and remained open until the pressure fell below the threshold level. Other systems used a wastegate between the exhaust manifold discharge and the exhaust system to regulate the turbocharger by diverting engine exhaust energy from the turbine. The wastegate of this prior system was actuated by a compressor discharge pressure sensing type valve. Because these systems operated independently, and both were either opened or closed depending on the compressor discharge pressure, the turbocharger had a very limited efficient range of operation. The range was so limited that it was necessary to use different turbocharger hardware, i.e. turbine and compressor wheels, for varying altitudes of operation and engine configurations.

Since the turbocharger's compressor and turbine wheels are sized not only for altitude, but also to achieve a rated horsepower at a desired speed for each particular engine, the power and torque output of an engine would drop dramatically when the engine is run at less than the rated speed or at a different altitude because the pressure sensing valves were only dependant on compressor discharge pressure and would actuate regardless of engine speed. For example, an engine rated at 190 psi BMEP (braking mean effective pressure) at 1,000 rpm, would have trouble producing 190 psi BMEP at 700 rpm because of the reduced output of the turbocharger due to the falling speed and because of the mechanical pressure sensing and releasing valves previously used.

Typically, large industrial internal combustion engines operate for long periods and are capable of generating thousands of horsepower. These engines are designed to operate at 10% over rated load intermittently, and are used for generating electrical power, pumping natural gas and oil, powering large ships and off-shore well drilling operations, and so on. In such applications, it is desirable to produce maximum power and/or maintain maximum torque at reduced engine speeds. However, because previous turbocharger control systems were simply a function of the compressor discharge pressure, the mechanical valves would release pressure regardless of the engine's speed and therefore regardless of the engine's need. Under such circumstances, when the engine speed is reduced but the load is maintained, the engine requires near constant intake manifold pressure to maintain torque output. Under these conditions, it would be desirable to adjust the bypass valve to change total mass airflow and adjust the wastegate to direct more engine exhaust to the turbocharger in order to produce near constant intake manifold pressure such that the compressor operates more efficiently at these speed and load conditions.

The present invention provides a simple and effective method and system for maintaining engine torque output at lower than rated speeds and at varying ambient temperatures and barometric pressures by stabilizing the turbocharger output within a predetermined range of efficient operation.

Another object of the present invention is to provide an electronic turbocharger control system, including a wastegate and bypass valve, which eliminates the need for matching individual compressor and turbine wheels of a turbocharger for each particular engine configuration and application. This particular aspect of the invention allows a manufacturer to use one set of turbocharger hardware for various engine applications. For example, prior to the present invention, as many as 13 different turbocharger wheels would be required to adequately cover a 0–7,000 foot above sea level range of elevations. With the present invention, one set of turbocharger hardware can be used at all elevations in this desired range. Further economic advantage is gained not only by the low cost of the electronic control relative to the high cost of the compressor and turbine wheels, but also by the elimination of inventory and the need for custom wheels for special applications. Customer satisfaction may also be greatly improved by the elimination of long procurement leadtimes for replacement components.

Another aspect of the invention is to provide constant torque at varying engine speeds allowing an operator to obtain additional load at reduced engine speed for increased fuel economy.

Another aspect of the invention is to provide maximum power over a range of engine speeds while maintaining the turbocharger in its most efficient range of operation.

Yet another aspect of the invention is to provide a control system which maintains turbocharger efficiency within a desired range of pressure ratio versus mass air-flow rates.

DETAILED DESCRIPTION OF THE PREFERRED EMBODIMENT

Figure 1:
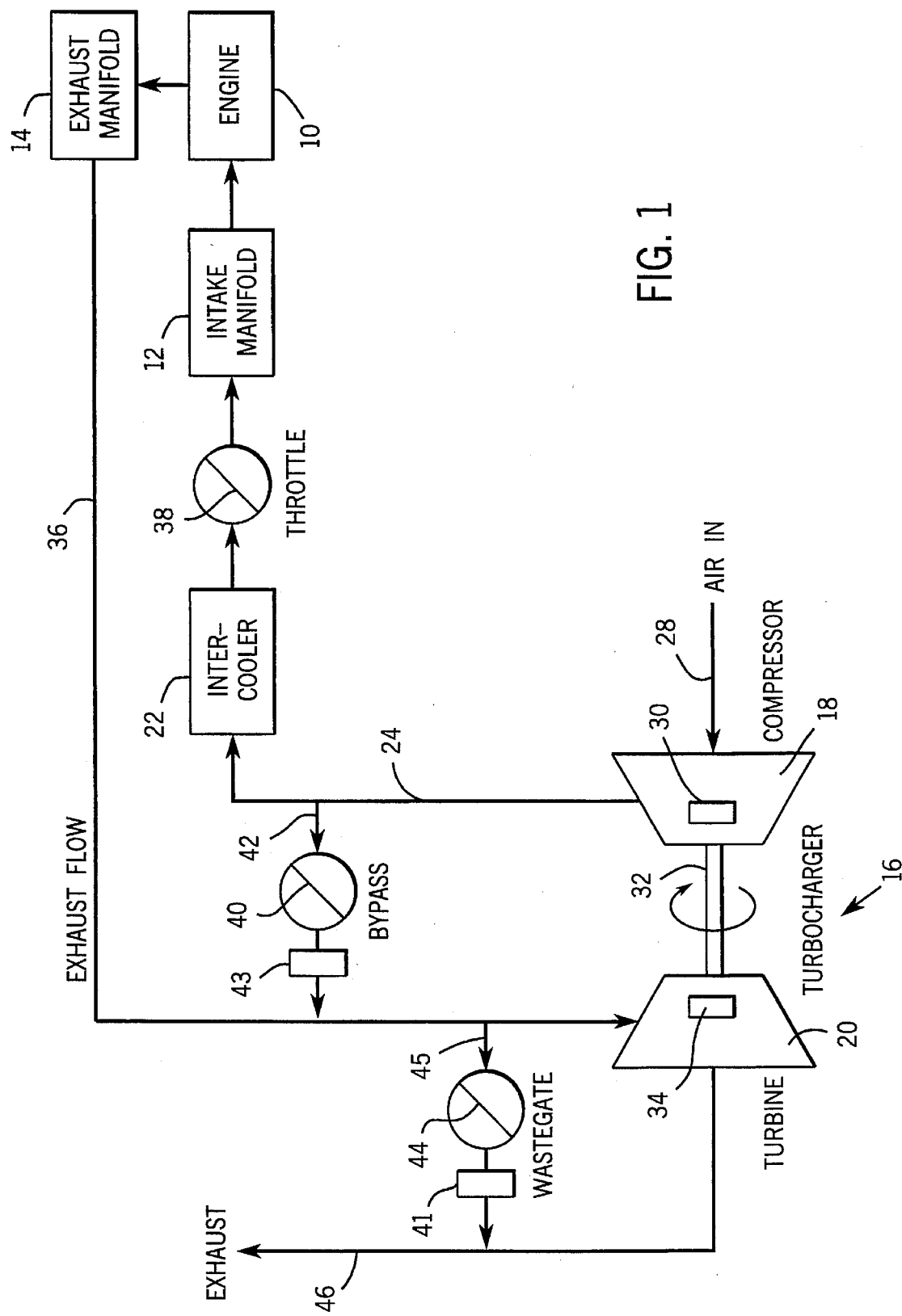
FIG. 1 is a schematic illustration of a system in accordance with the invention.

As shown in FIG. 1 and in accordance with the present invention, an engine 10 includes an intake manifold 12 and an exhaust manifold 14 functionally connected to a turbocharger 16. Turbocharger 16 includes a compressor 18 and turbine 20. The input of compressor 18 is connected to an air cleaner (not shown) with air intake duct 28. The air cleaner filters intake air from atmospheric/barometric pressure which is drawn into compressor 18 through air intake duct 28 under partial vacuum created by compressor wheel 30 in compressor 18. Compressor wheel 30 is driven by shaft 32 which is driven by turbine wheel 34 in turbine 20. Turbine wheel 34 is driven by engine exhaust provided to turbine 20 by engine exhaust duct 36 which is connected to exhaust manifold 14 of engine 10.

The output of compressor 18 is connected to intercooler 22 by compressor discharge duct 24. Compressor wheel 30 compresses intake air and forces it through compressor discharge duct 24 to intercooler 22 which functions as a heat exchanger removing excess heat from the turbocharged intake air as is commonly known. Turbocharged intake air is then channelled to throttle 38, intake manifold 12, and to engine 10. Throttle 38 creates a pressure differential depending on its position, such that air pressure into the throttle is at compressor discharge pressure and air pressure out of the throttle is at intake manifold pressure.

Bypass valve 40, in bypass duct 42, connects compressor discharge duct 24 and engine exhaust duct 36 to functionally relieve pressure in compressor discharge duct 24 and increase airflow through compressor 18 by regulating airflow through bypass duct 42. Wastegate 44, in discharge duct 45, connects engine exhaust duct 36 and exhaust discharge duct 46 to functionally divert engine exhaust in exhaust duct 36, thereby decreasing exhaust mass airflow to turbine 20 which decreases the compressor discharge pressure produced by compressor 18 by regulating the amount of engine exhaust through discharge duct 45.

Figure 2:
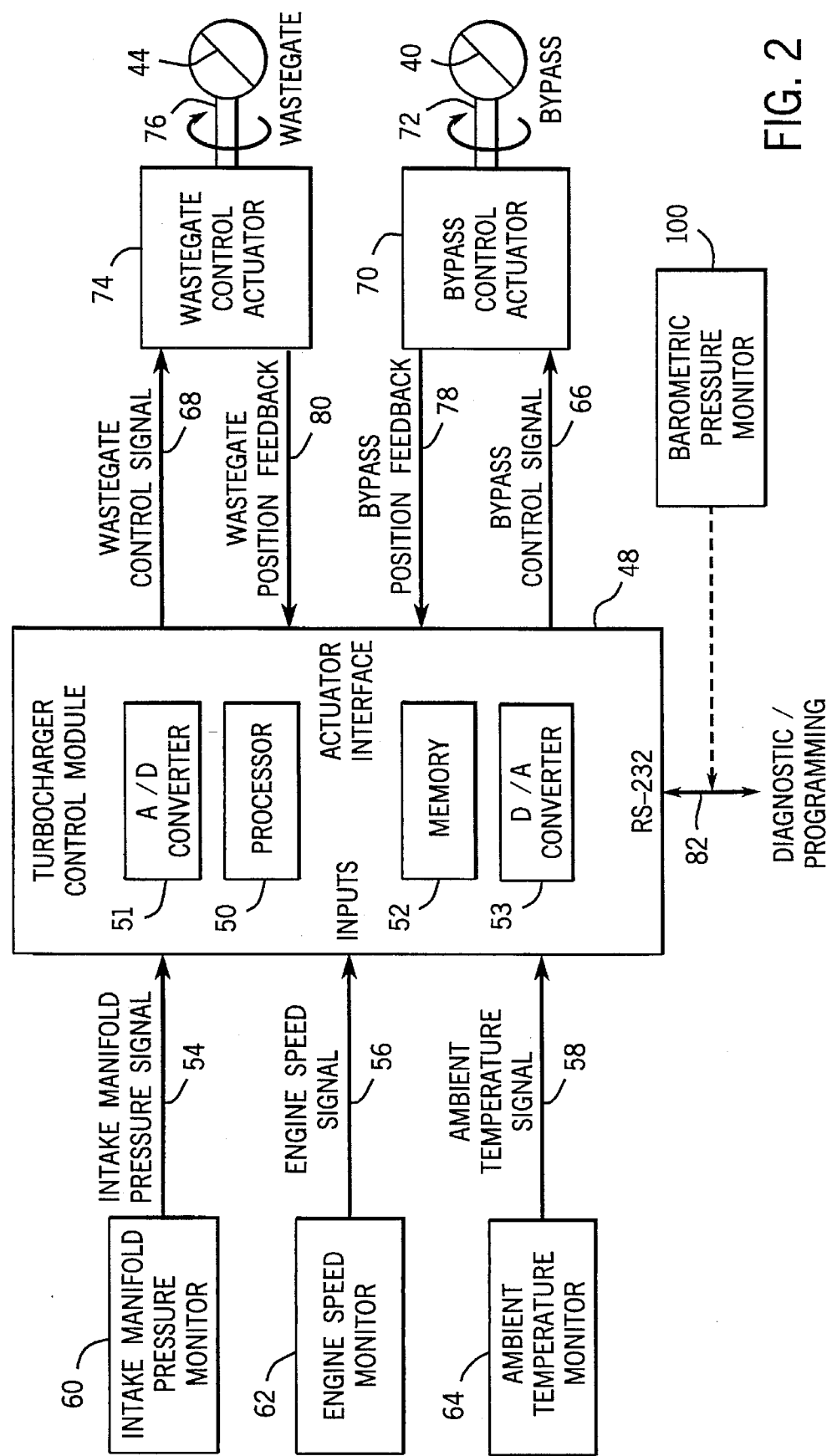
FIG. 2 is a schematic illustration of a control system in accordance with the invention.

Turbocharger control module 48, FIG. 2, includes processor 50 and memory 52. In the preferred embodiment, memory 52 is an electrically erasable programmable read only memory (EEPROM) in which the parameters programmed therein can be changed and adjusted in the field. Turbocharger control module 48 has a plurality of engine characteristic signal inputs, namely intake manifold pressure signal 54, engine speed signal 56, and ambient temperature signal 58. The signals are produced by a plurality of engine characteristic monitors, namely intake manifold pressure monitor 60 for sensing engine load, engine speed monitor 62 for sensing engine speed, and ambient temperature monitor 64 for sensing external temperature. Signals 54, 56 and 58 are input to module 48 in analog form and converted to digital form by analog to digital (A/D) converter 51. Processor 50, of turbocharger control module 48, processes the characteristic signals by selecting predetermined values from memory 52 for the bypass control signal 66 and wastegate control signal 68 based upon the values of the characteristic signals and a preprogrammed barometric pressure. Digital to analog (D/A) converter 53 converts the digital signal produced by processor 50 to the analog signals 66 and 68 within module 48.

Bypass control actuator 70 senses bypass control signal 66 and responds by rotating shaft 72 which changes the angular position of bypass valve 40. Similarly, wastegate control actuator 74 senses wastegate control signal 68 and rotates shaft 76 to change the angular position of wastegate 44. Bypass control actuator 70 and wastegate control actuator 74 are electromechanical controls that include a DC motor and a driving gear train (not shown) which are commonly known. Actuators 70 and 74 each include a potentiometer (not shown) for sensing the position of shafts 72 and 76 and producing a bypass position feedback signal 78 and wastegate position feedback signal 80, respectively. Turbocharger control module 48 senses the position feedback signals 78 and 80, converts the analog signals to digital signals in A/D converter 51, compares the digital signals to the desired positions of bypass valve 40 and wastegate 44 previously determined, creates revised control signals, converts the digital signals to analog signals in D/A converter 53 and responds with an appropriate bypass control signal 66 and wastegate control signal 68 to adjust bypass valve 40 and wastegate 44 to the desired positions.

Memory 52 of turbocharger control module 48 is preprogrammed with sets of predetermined parameters reflecting desired settings for bypass valve 40 and wastegate 44. Each set of parameters is based upon engine characteristic signals 54, 56, 58 and an operating system barometric pressure determined for a given altitude. The present embodiment uses three sets of parameters based on altitude, one for 0–3,000 feet, one for 3,000–5,000 feet and one for 5,000–7,000 feet; however, it is within the contemplation of the invention to vary the number of sets, as well as the ranges within each set. RS-232 port 82 provides a service port to connect a computer to turbocharger control module 48, as is well known, for initial and reset programming and for diagnosing errors in the module.

Figure 3:
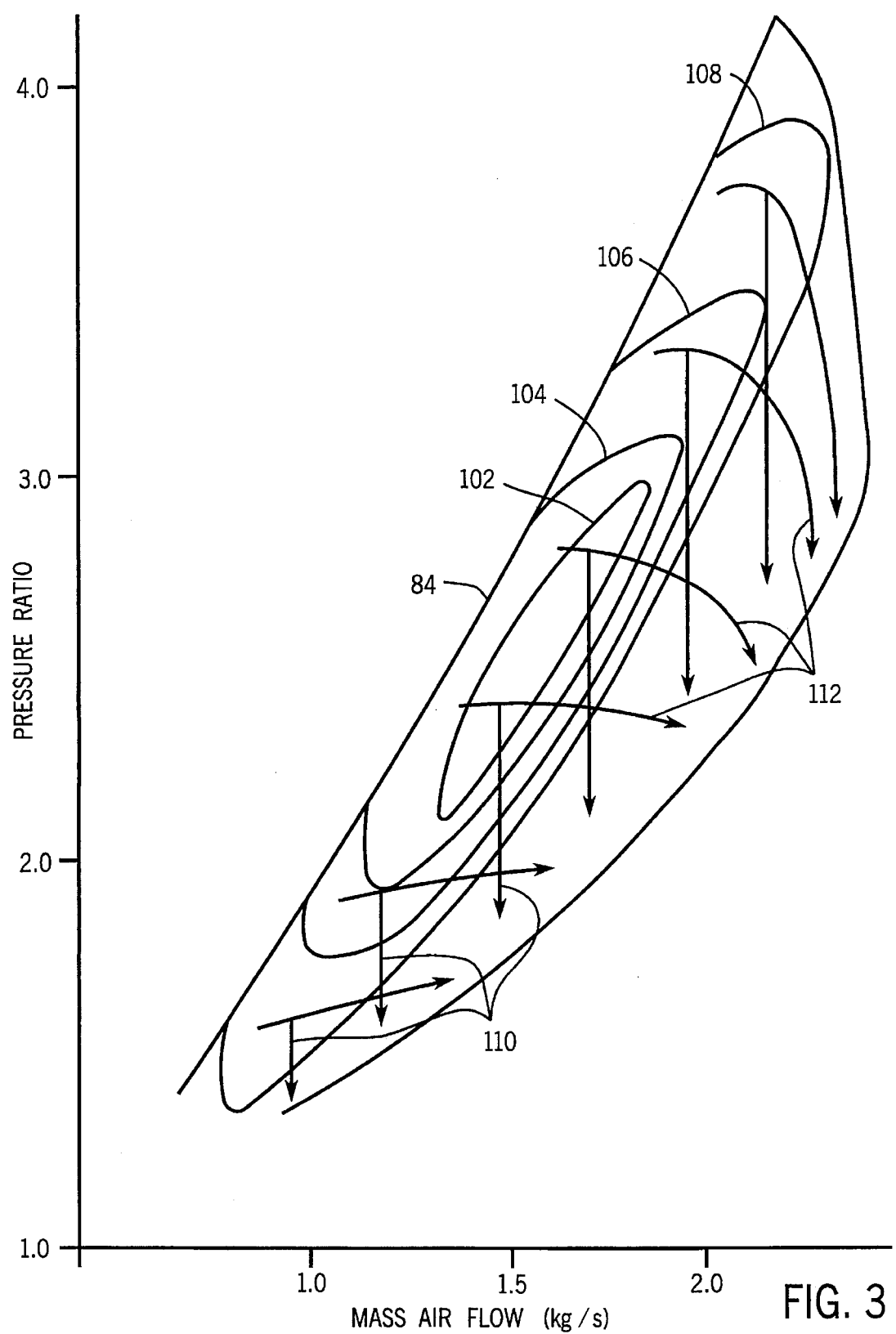
FIG. 3 is a typical graph of a ratio of compressor discharge pressure over barometric pressure vs. mass airflow of a turbocharger compressor.

The turbocharger control system of the present invention is used on large, industrial internal combustion engines which are typically installed on stationary, non-mobile installation sites. Therefore, during the initial factory set-up, the barometric pressure is calibrated on an absolute basis, then later when the installation site altitude is determined, the turbocharger control module is programmed via RS-232 port 82 from barometric pressure monitor 100 to program processor 50 to select the correct set of preprogrammed parameters from memory 52 which correspond to the engine operating environment's barometric pressure. In this manner, turbocharger 16, FIG. 1, can be controlled to operate within the preferred bands of operation shown in FIG. 3 as kidney shaped curves 102, 104, 106 and 108, which are also known as islands of efficiency. FIG. 3 shows the ratio of compressor discharge pressure over barometric pressure versus the mass airflow through the turbocharger compressor. Optimum turbocharger compressor output is obtained when the mass airflow and pressure ratio are centered within the islands of efficiency 102, 104, 106 and 108. During testing at various engine speeds and loads, it was found that opening wastegate 44, FIG. 1, lowers the pressure ratio of the vertical axis, shown by wastegate lines 110, FIG. 3, while opening bypass valve 40, FIG. 1, increases the mass airflow of the horizontal axis but also may change the pressure ratio of the vertical axis, shown by bypass curves 112, FIG. 3. By testing the system at various engine speeds and loads, an optimum wastegate 44, FIG. 1, angular position and bypass valve 40 angular position can be determined to control compressor discharge pressure and mass airflow within the islands of efficiency 102, 104, 106 and 108, FIG. 3. Processor 50, FIG. 2, of turbocharger control module 48, processes the digital form of intake manifold pressure signal 54, engine speed signal 56 and ambient temperature signal 58, and being preprogrammed for the barometric pressure of the operating system's environment, accesses a look-up table in memory 52 and produces bypass control signal 66 and wastegate control signal 68, as previously described, which independently control bypass valve 40 and wastegate 44 to the desired positions to maintain operation within the efficiency islands 102, 104, 106 and 108, FIG. 3.

Figure 4:
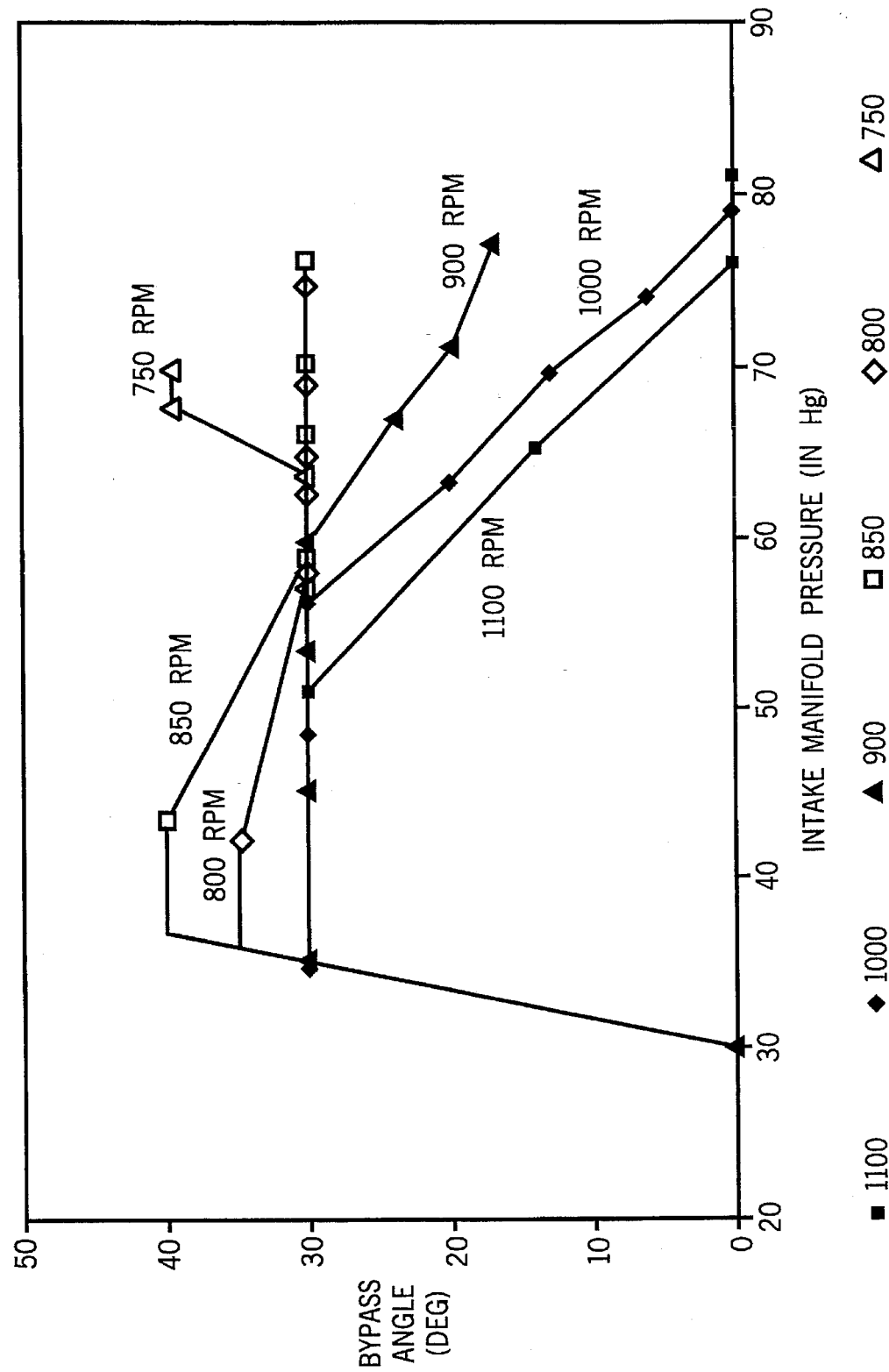
FIG. 4 is a typical graph of the bypass valve position vs. intake manifold pressure.

Bypass valve 40, FIG. 1, performs two functions. First, because during engine start-up the engine exhaust pressure in engine exhaust duct 36 is greater than the compressor discharge pressure in duct 24, bypass valve 40 is closed to prevent the passage of engine exhaust into compressor discharge duct 24. Second, bypass valve 40 regulates compressor discharge pressure and mass airflow once the engine is running at a minimum idle speed, typically 650 to 750 rpm. Once the minimum engine rpm is reached, bypass valve 40 is regulated through a range of effective bypass valve angles. Although testing was conducted on a range from 0° to 80° in FIG. 3, FIG. 4 displays the effective angles to be between 0° and 40°. FIG. 4 is a typical graph of bypass valve angle versus intake manifold pressure for various engine speeds. As shown, bypass valve 40, FIG. 1, is held closed until a minimum intake manifold pressure is obtained. Once the minimum intake manifold pressure is reached, in this case 30 inches of mercury, bypass valve 40 is set at a predetermined angle depending on the engine characteristic signals.

Figure 5:
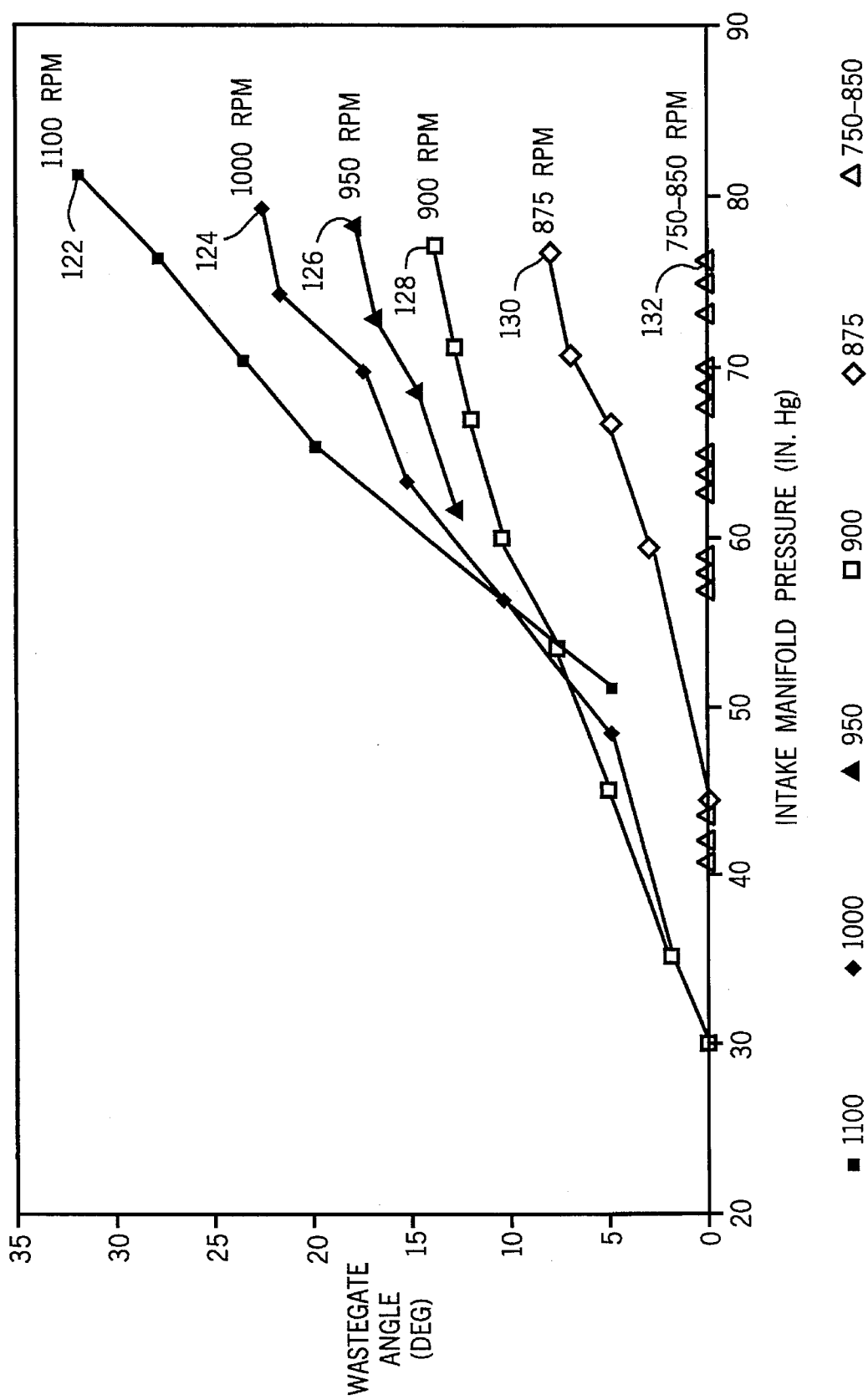
FIG. 5 is a typical graph of the wastegate position vs. intake manifold pressure.

Similar to bypass valve 40, wastegate 44 was also tested in the range of 0° to 80° in FIG. 3; however, FIG. 5 shows the effective angles to be between 0° and 35°. FIG. 5 is a typical graph of wastegate angle versus intake manifold pressure for various engine speeds. When closed, wastegate 44, FIG. 1, causes nearly all of the engine exhaust to pass into turbine 20 and out exhaust discharge line 46. Wastegate 44 is closed, for example, during initial engine start-up to direct full engine exhaust through turbine 20 to drive turbine wheel 34 which drives shaft 32 and compressor wheel 30 until the intake manifold pressure reaches a minimum level as indicated by a pressure ratio between 1.25 and 1.4, FIG. 3. Typical effective wastegate angle settings are shown in FIG. 5 for engine speeds ranging from 750 to 1100 rpm at an exemplary altitude of 650 feet above sea level and an ambient temperature of 90° F. FIG. 5 shows how the invention achieves the desired constant intake manifold pressure when the engine speed drops by changing the wastegate angle which results in near constant intake manifold pressure as shown, for example, at data points 122, 124, 126, 128, 130 and 132. Maintaining substantially constant intake manifold pressure, as indicated, achieves substantially constant torque output. Functionally, wastegate 44, FIG. 1, operates to divert increasing portions of the engine exhaust to exhaust discharge duct 46, and away from turbine 20, with increasing wastegate angle as shown in FIG. 5, which thereby limits the speed of turbine wheel 34, shaft 32, and compressor wheel 30, FIG. 1, to control compressor discharge pressure, as shown by wastegate lines 110, FIG. 3.

The angles of bypass valve 40 shown in FIG. 4 and wastegate 44 shown in FIG. 5 are illustrative only and may vary depending on system configuration. For example, an orifice 41, 43, FIG. 1, placed in bypass duct 42 and/or wastegate duct 45 allows a fuller range of effective angles of the wastegate and/or bypass valve and therefore decrease any error resulting from mechanical linkage tolerances. Further, using differing orifice sizes allows the use of the same wastegate and/or bypass valve in different engines and applications, thereby further reducing inventory and eliminating long procurement leadtimes for replacements.

Opening bypass valve 40, FIG. 1, increases mass airflow through compressor 18 of turbocharger 16, as shown by bypass curves 112, FIG. 3, by providing an additional route for compressor airflow to direct airflow into engine exhaust duct 36, FIG. 1. Opening wastegate 44 decreases intake compressor discharge pressure by diverting engine exhaust away from turbine 20 and routing it directly to exhaust discharge duct 46. As shown in FIG. 3 and previously described, by simultaneously adjusting the angular position of bypass valve 40, FIG. 1, and wastegate 44, turbocharger 16 can be controlled to operate within the kidney shaped islands of efficiency 102, 104, 106 and 108, FIG. 3.

The islands of efficiency 102, 104, 106 and 108 are common characteristic traits of centrifugal compressors—the type used in turbochargers—wherein operation within the center of the islands provide maximum compressor efficiency. It is also known that operating near surge line 84, FIG. 3, can create pressure waves between turbocharger 16, FIG. 1, and engine 10 resulting in unstable operation which can cause engine damage. Therefore, a slight safety factor is set into the predetermined parameters to operate slightly right of the center of the islands 102, 104, 106 and 108, FIG. 3.

In twin bank engine configurations (i.e. V-6, V-8, V-10, V-12, V-16, ...) two turbochargers 16, FIG. 1, may be used for providing turbocharged air to engine 10 through intercooler 22. In such an arrangement, one larger bypass valve 40 and wastegate 44 may be used. However, in the present invention, two bypass valves 40 and two wastegates 44 are each arranged as in FIG. 1 and merge at intercooler 22. A single control module 48, FIG. 2, operates as previously described controlling both bypass valves 40 with a single bypass control actuator 70 and both wastegates 44 with a single wastegate control actuator 74. The multiple turbocharger system operates identically to the single turbocharger system except that consideration must be given for the mechanical tolerances between the two compressor wheels and the two turbine wheels. To compensate for such additional tolerances, it is preferred to operate the turbochargers further right of the center of the efficiency islands 102, 104, 106 and 108, FIG. 3, to avoid engaging the surge line 84 yet remaining within an island at all times.

Moving to the right of the efficiency islands 102, 104, 106 and 108, FIG. 3, is accomplished by increasing the mass airflow through compressor 18, FIG. 1, by slightly increasing the angular amount bypass valve 40 is opened, as shown by bypass curves 112, FIG. 3. The slight increase in mass airflow through the dual turbochargers offsets any tolerances due to a mismatch between the compressor wheels and/or the turbine wheels of the dual turbochargers by keeping a safe distance from surge line 84, yet maintaining operation within the efficiency islands. Under some conditions, the increase in airflow results in a loss of compressor discharge pressure as shown by bypass curves 112, FIG. 3. This pressure loss is compensated by decreasing the angular amount wastegate 44, FIG. 1, is opened. In other words, decreasing exhaust flow through wastegate 44, will increase the compressor discharge pressure to compensate for the pressure loss associated with further opening bypass valve 40.

An important requirement in carbureted internal combustion engines is to maintain a pressure reserve across throttle 38, FIG. 1. The pressure reserve can be determined by sensing the pressure on both sides of throttle 38 and subtracting the two sensed pressures to determine a $\Delta P$ which is considered the pressure reserve. The pressure reserve $\Delta P$ permits engine 10 to accept greater loads at constant speed or to accelerate at constant load upon the opening of throttle 38 without hesitation due to the lack of intake manifold pressure. However, to obtain optimum engine efficiency, it is desired to maintain throttle 38 in an open position to avoid blocking energy in the form of airflow into the engine. The amount of pressure reserve $\Delta P$ across throttle 38 can be regulated is by controlling the amount of compressor discharge pressure from compressor 18. This is accomplished by adjusting wastegate 44 to regulate the amount of engine exhaust through turbine 20 which controls compressor 18 output. By controlling the mass airflow rate through compressor 30, throttle 38 can be opened to a greater angle thereby obtaining greater engine efficiency by reducing the exhaust back pressure associated with the higher compressor discharge pressure, yet maintaining enough pressure reserve $\Delta P$ to accelerate or accept additional engine loading without hesitation. This increase in throttle angle also reduces energy loss across the throttle, thereby increasing engine efficiency.

Figure 6:
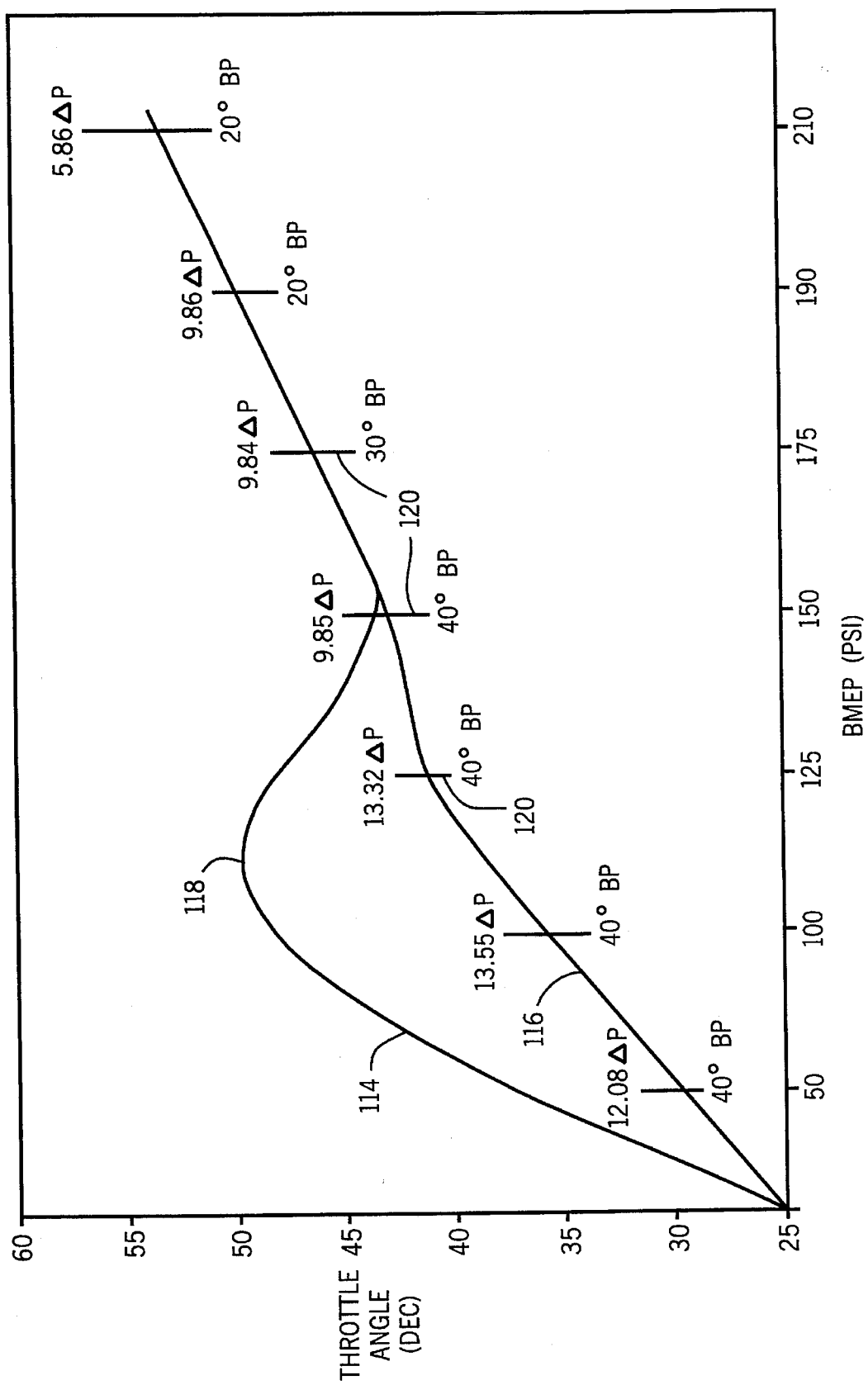
FIG. 6 is a typical graph of throttle angle position vs. brake mean effective pressure.

Another common problem with turbocharged engines overcome by the present invention is that the typical nonlinear throttle angle profile curve 114, FIG. 6, which is most evident in cold climates, is now more linear, shown as curve 116, which results in improved throttle control. FIG. 6 shows the throttle angle versus brake mean effective pressure graph for an exemplary 1,000 rpm engine speed. Prior to the present invention, as an increasing load is applied to the engine, for example 0 to 210 psi BMEP, as shown in FIG. 6, the throttle angle must increase quickly to compensate for turbocharger lag, which is an inherent condition of turbocharged engines, but once the turbocharger creates enough compressor discharge pressure, the throttle angle must be quickly reduced thereby creating an inflection point 118, FIG. 6. The rapid changes in throttle angle were required to maintain constant engine rpm with the increasing compressor discharge pressure. Once the compressor output reaches a plateau, the throttle angle must be reduced to compensate for the increased compressor discharge pressure until the increase in load overcomes the increase in turbocharger output at which point the throttle angle must again be increased to maintain engine speed. However, this erratic nonlinear throttle angle curve 114 has been extremely difficult to implement with accuracy. Throttle angle is controlled by a governor (not shown) and in practice, compensating for turbocharger output with throttle angle results in erratic engine speeds and surges which are inefficient and undesirable.

An objective of the present invention was to provide stable operation by creating a more linear throttle angle versus load curve by simultaneously controlling the function of bypass valve 40, FIG. 1, and wastegate 44. Throttle angle curve 116, FIG. 6, is now more linear by adjusting bypass valve 40, FIG. 1. Exemplary bypass (BP) valve angles are shown at test points 120, FIG. 6—for example, to achieve throttle angle curve 116 and pull a load (BMEP) of 125 psi, a bypass valve angle of 40° (40° BP) will result in a throttle angle of approximately 42° and at a load of 175 psi, a bypass valve angle of 30° (30° BP) will result in a throttle angle of approximately 46°. However, a byproduct of adjusting bypass valve 40 is a corresponding change in the pressure reserve $\Delta P$ across throttle 38, FIG. 1. Adjusting wastegate 44, as previously set forth, provides adequate pressure reserve $\Delta P$ as shown in FIG. 6. At each test point 120, the amount of pressure reserve $\Delta P$ is shown in inches of mercury. At lower engine load conditions greater amounts of pressure reserve $\Delta P$ are required to allow additional load acceptance without hesitation. Opening wastegate 44 results in lowering the pressure reserve $\Delta P$. At the upper load end of FIG. 6, a decreasing reserve $\Delta P$ is preferred because in this instance, the engine is at or near its rated loading capacity and little additional load would be permitted and therefore less pressure reserve is needed to maintain proper engine control, and a lower reserve $\Delta P$ provides more efficient operation, as previously described. For example, an engine rated at 190 psi BMEP, as is the case in FIG. 6, a pressure reserve $\Delta P$ of approximately 12–14 inches of mercury is required at 125 psi BMEP, whereas, 5–7 inches of mercury is sufficient at 210 psi BMEP. Similar results can be achieved at various engine speeds, ambient temperatures and barometric pressures.

As shown in FIG. 5, when engine speed is reduced at constant load (i.e. constant intake manifold pressure), the wastegate angle is reduced which increases throttle reserve $\Delta P$ and provides more torque from the engine with lower speed than in previous speed insensitive systems which would lose intake manifold pressure at lower speeds resulting in decreased torque output. FIG. 5 discloses efficient wastegate angles for each particular engine speed to achieve a desired intake manifold pressure and pressure reserve $\Delta P$.

It is recognized that various equivalents, alternatives, and modifications are possible within the scope of the appended claims.

We claim:

1. An electronic turbocharger control system for an internal combustion engine comprising:

at least one turbocharger connected to the engine and having a turbine and a compressor;

a plurality of engine characteristic monitors to sense at least engine speed and intake manifold pressure;

plurality of engine characteristic signals produced by the plurality of engine characteristic monitors;

an electronic control for processing the characteristic signals;

a control signal produced by the electronic control in response to the characteristic signals;

a bypass valve connected between the compressor and the turbine for changing airflow through the compressor in response to the control signal; and wherein the electronic control comprises a memory programmed with predetermined parameters wherein the electronic control selects a predetermined parameter from the memory and produces the control signal based upon the engine characteristic signals, wherein the memory comprises sets of predetermined parameters, each set based upon barometric pressure.

2. The control system of claim 1 wherein the electronic control is preprogrammed to select the correct set of predetermined parameters for a given barometric pressure.

3. An electronic turbocharger control system for an internal combustion engine comprising:

at least one turbocharger connected to the engine and having a turbine and a compressor;

a plurality of engine characteristic monitors for monitoring engine speed, engine load, and ambient temperature;

a plurality of engine characteristic signals produced by the plurality of engine characteristic monitors;

an electronic control for processing the characteristic signals;

a control signal produced by the electronic control in response to the characteristic signals;

a bypass valve connected between the compressor and the turbine for changing airflow through the compressor in response to the control signal; and a bypass control actuator to create a response signal indicating a position of the bypass valve.

4. The control system of claim 3 wherein the electronic control receives the response signal and monitors the bypass valve position.

5. An electronic turbocharger control system for an internal combustion engine comprising:

at least one turbocharger connected to the engine and having a turbine and a compressor;

a plurality of engine characteristic monitors for monitoring engine speed, engine load, and ambient temperature;

a plurality of engine characteristic signals produced by the plurality of engine characteristic monitors;

an electronic control for processing the characteristic signals;

a control signal produced by the electronic control in response to the characteristic signals;

a bypass valve connected between the compressor and the turbine for changing airflow through the compressor in response to the control signal; and a bypass duct having a bypass valve and an orifice therein.

6. An electronic turbocharger control system for an internal combustion engine comprising:

at least one turbocharger connected to the engine and having a turbine and a compressor;

at least one engine characteristic monitor;

an engine characteristic signal produced by the monitor;

an electronic control for processing the characteristic signal;

a control signal produced by the processor in response to the characteristic signal;

a bypass valve connected between the compressor and the turbine for changing airflow through the compressor in response to the control signal; and a bypass control actuator to create a feedback signal indicating a position of the bypass valve.

7. The control system of claim 6 wherein the electronic control receives the feedback signal for monitoring the bypass valve position and adjusts the bypass valve in response to the feedback signal.

8. An electronic turbocharger control system for an internal combustion engine comprising:

at least one turbocharger connected to the engine and having a turbine and compressor;

a barometric pressure monitor providing a barometric pressure signal;

an ambient temperature monitor providing an ambient temperature signal;

an electronic control for producing a control signal in response to the barometric pressure signal and the ambient temperature signal; and a bypass valve connected between the compressor and the turbine for changing airflow through the compressor in response to the control signal;

wherein the electronic control comprises a memory programmed with predetermined parameters, and wherein the electronic control selects the control signal from the predetermined parameters and the memory based upon the barometric pressure signal; and the memory comprises sets of predetermined parameters, each set based upon barometric pressure.

9. An electronic turbocharger control system for an internal combustion engine comprising:

at least one turbocharger connected to the engine and having a turbine and compressor;

a barometric pressure monitor providing a barometric pressure signal;

an ambient temperature monitor providing an ambient temperature signal;

an electronic control for producing a control signal in response to the barometric pressure signal and the ambient temperature signal;

a bypass valve connected between the compressor and the turbine for changing airflow through the compressor in response to the control signal;

wherein the electronic control comprises a memory programmed with predetermined parameters, and wherein the electronic control selects the control signal from the predetermined parameters and the memory based upon the barometric pressure signal; and the electronic control further comprises an external port for initially connecting the barometric pressure monitor and receiving the barometric pressure signal, and thereafter having the external port for reconnecting the barometric pressure monitor and updating the barometric pressure signal.

10. An electronic turbocharger control system for an internal combustion engine comprising:

at least one turbocharger connected to the engine and having a turbine and compressor;

a barometric pressure monitor providing a barometric pressure signal;

an ambient temperature monitor providing an ambient temperature signal;

an electronic control for producing a control signal in response to the barometric pressure signal and the ambient temperature signal;

a bypass valve connected between the compressor and the turbine for changing airflow through the compressor in response to the control signal; and a bypass control actuator to create a feedback signal indicating a position of the bypass valve.

11. The control system of claim 10 wherein the electronic control receives the feedback signal for monitoring the bypass valve position and adjusts the bypass valve in response to the feedback signal.

* * * * *